United States Patent [19]

Widenmann

[11] Patent Number: 4,771,806

[45] Date of Patent: Sep. 20, 1988

[54] PILOT-CONTROLLED PRESSURE-LIMITING VALVE

[75] Inventor: Karl Widenmann, Giengen/Brenz, Fed. Rep. of Germany

[73] Assignee: Max Widenmann Armaturenfabrik, Fed. Rep. of Germany

[21] Appl. No.: 80,549

[22] Filed: Jul. 31, 1987

[51] Int. Cl.[4] ............................................. F16K 17/10
[52] U.S. Cl. .................................... 137/491; 137/492.5
[58] Field of Search ............. 137/491, 489, 492, 492.5

[56] References Cited

U.S. PATENT DOCUMENTS

| | | | |
|---|---|---|---|
| 919,300 | 4/1909 | Anderson | 137/492 |
| 2,500,888 | 3/1950 | Wilhelm | 137/491 |
| 3,211,174 | 10/1965 | Weise | 137/489 X |
| 3,373,763 | 3/1968 | Smilges | 137/489 X |
| 3,399,696 | 9/1968 | Shaw | 137/489 X |

Primary Examiner—Alan Cohan
Attorney, Agent, or Firm—Gerald J. Ferguson, Jr.

[57] ABSTRACT

A compact pressure-limiting valve is provided for optional attachment to a water-conducting device which for this purpose comprises a flange which matches the connecting flange of the pressure-limiting valve and which can be closed with a closure-plate when the pressure-limiting valve is not required. A compact unit providing high response speed of the pressure-limiting valve is achieved by a particular relative arrangement of the main piston and the pilot valve piston and by short and loss-free flow connections in the interior of the pressure-limiting valve. In spite of the high response speed and the compact constructional form the pressure-limiting valve is distinguished by a large flow cross-section for levelling pressure peaks.

7 Claims, 3 Drawing Sheets

PILOT-CONTROLLED PRESSURE-LIMITING VALVE

The invention relates to a pilot-controlled pressure-limiting valve which lies in a flow passage and the annular-disc-shaped main piston of which on its side facing the flow passage cooperates with an annular valve seat and on its rear side closes a control space which communicates via a throttled connection passage with the flow passage and via a liquid passage closable via the pilot valve can be relieved to the surrounding atmosphere, comprising a discharge which originates from an annular passage surrounding the main piston on its side remote from the flow passage.

Such a pilot-controlled pressure-limiting valve is known from German published application No. 1,036,594. It is used in particular in water-conducting devices for limiting the maximum operating pressure. On rapid opening or closing of the shutoff valves on pumps, distributors or jet pipes, in the hose lines pressure surges arise which can be several times the operating pressure. Pressure surges can also occur when vehicle wheels pass over hose lines and when relatively large consumers are shut off. In the hose lines and in particular in the jet pipes connected to them unexpectedly high reaction forces can then occur which involve a considerable danger of an accident. To avoid these dangers pressure-limiting valves are used which are generally inserted as independent devices into the hose lines.

With relatively large water-conducting line systems pressure-limiting valves may be required at several positions. The expenditure involved for the necessary pressure-limiting valves can then become considerable.

The present invention provides a pilot-controlled pressure-limiting valve which is suitable for easy and compact arrangement on existing water-conducting devices.

According to the invention the valve seat of the main piston is disposed adjacent a connection flange on a housing separate from the device comprising the flow passage, the valve piston of the pilot valve is disposed with its axis perpendicular to the axis of the main piston, the liquid passage closable by the pilot valve comprises an annular passage which surrounds the valve piston of the pilot valve and which lies adjacent the control space and is connected to the latter via a bore and also surrounds a valve seat with which the valve piston of the pilot valve cooperates, and the valve piston is connected to a diaphragm which is clamped at the housing and which defines a pilot space which is separate from the annular passage and which is connected to the flow passage via a conduit leading coaxially through the main piston.

The pilot-controlled pressure-limiting valve according to the invention is distinguished by a very compact constructional form and can therefore be easily and subsequently attached to existing devices such as shutoff valves, distributors, gate valves, annular piston valves and the like. These devices in turn have a flange corresponding to the connecting flange of the pressure-limiting valve, said flange being closed by a closure plate when the pressure-limiting valve is not used. Thus, when required the pressure-limiting valve can be attached to existing fittings. The compact constructional form of the pressure-limiting valve and the particular arrangement of its components with respect to each other results in the flow connection, decisive to the response speed of the pressure-limiting valve, being very short and low-loss so that response times are achieved which are considerably shorter than the actuating times of conventional shutoff members or valves. In practical embodiments an opening time of the pilot-controlled pressure-limiting valve of only about 0.04 to 0.05 seconds has been achieved. Nevertheless, for pressure limitation large amounts of liquid can be discharged in controlled manner because the annular-disc-shaped main piston and the annular channel surrounding its valve seat permit a large flow cross-section from the flow passage to the discharge with low flow losses.

Advantageous embodiments of the invention are set forth in the subsidiary claims.

With an adjustable throttle screw provided in the connecting passage the flow resistance of said connecting passage can be optimally set to adapt the switching characteristic of the pressure-limiting valve to the specific use.

A particularly reliable function of the pilot valve is achieved by cooperating metallic sealing faces of the pilot valve which are subjected to practically no wear.

A tubular sieve or screen provided in a preferred embodiment in the conduit passing coaxially through the main piston ensures that the function of the pilot valve will not be impaired by contaminations. The tubular form of this sieve gives a large filtering area and consequently a low flow resistance as is important to the highspeed response of the pressure-limiting valve.

Because of the compact form of the pressure-limiting valve according to the invention for setting the maximum pressure at which the pressure-limiting valve is to function, a relatively short setting path is convenient so that when required an adjustment over the entire adjustment range can be made within the shortest possible time. Therefore, in the preferred embodiment the rotary movement of the setting member is converted by a high pitch helical screw thread and a cooperating nut member into a corresponding axial movement of the setting bolt which governs the biasing of the pressure spring which on the side of the diaphragm opposite the valve piston acts on said diaphragm in the closure direction of the valve piston. In this manner the entire adjustment range of the pressure-limiting valve can be covered with a rotation of the setting member through only about 240°.

In a further embodiment several bores are formed in the separate housing of the pressure-limiting valve, and a check valve is disposed in each bore. Via said check valves the pressure-limiting valve can be drained when the fitting on which it is mounted is not being used in order for example to prevent frost damage.

Further features and advantages of the invention will be apparent from the following description of an embodiment of the invention and from the drawings, to which reference is made and in which.

Figure 1:
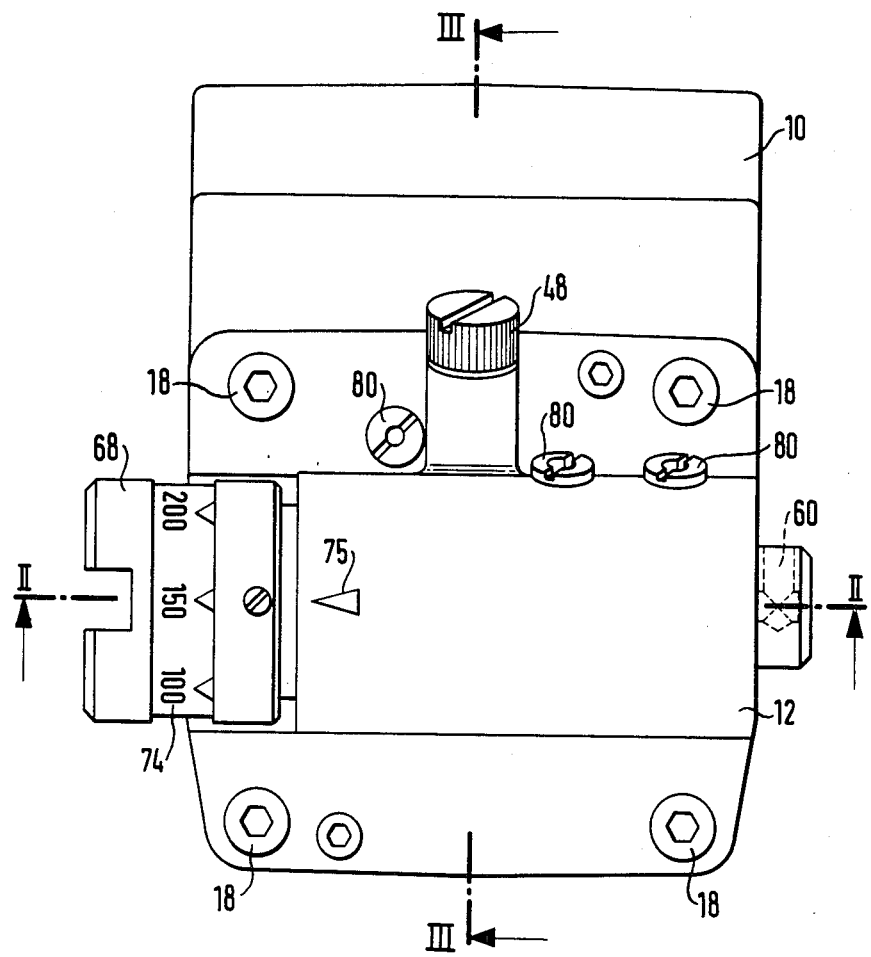
FIG. 1 shows a plan view of the pilot-controlled pressure-limiting valve.

In the embodiment shown the housing separate from the water-conducting device to which the pressure-limiting valve can be attached consists of a valve housing 10 and a control housing 12 disposed thereon which is sealed by a ring seal 14 with respect to the valve housing 10. The valve housing 10 comprises an annular connecting flange 16 which is made to match a corresponding flange of a water-conducting fitting (not shown) which can be equipped with the pilot-controlled pressure-limiting valve when required. The mounting of the pressure-limiting valve on the fitting is by means of four screws 18 which are led axis-parallel through the valve housing 10. If the pressure-limiting valve is not required in its place a blind flange may be attached to the water-conducting fitting. The sealing of the water-conducting fitting and the valve housing 10 is by means of a ring seal 20. The connecting flange 16 surrounds an annular passage 22 which communicates with the flow passage of the water-conducting fitting (not shown) via the flange thereof. The valve housing 10 forms an annular passage 24 which lies coaxial to the passage 22 and surrounds the skirt of a main piston 26. The main piston 26 carries on its end face facing the passage 22 a ring seal 28 cooperating with an annular valve seat 30 arranged adjacent the connecting flange 16. The main piston 26 comprises an axial bore 32 by which it is guided with sliding fit displaceably in the axial direction on a tubular guide extension 34 of the control housing 12. The tubular guide extension 34 forms a conduit 26 which is coaxial with the passage 22 and the main piston 26 and via which the flow passage of the water-conducting fitting is connected to the control housing 12. At its outer periphery the main piston 26 is slidingly sealed by means of a seal 38 on a cylindrical apron 40 of the control housing 12 projecting into the valve housing 10. The sealing of the main piston 26 at the tubular guide extension 38 of the control housing 12 is by means of a lip seal 42. The main piston 26 is acted upon by a pressure spring 44 in the closure direction against the valve seat 30, said spring bearing on the control housing 12.

Figure 2:
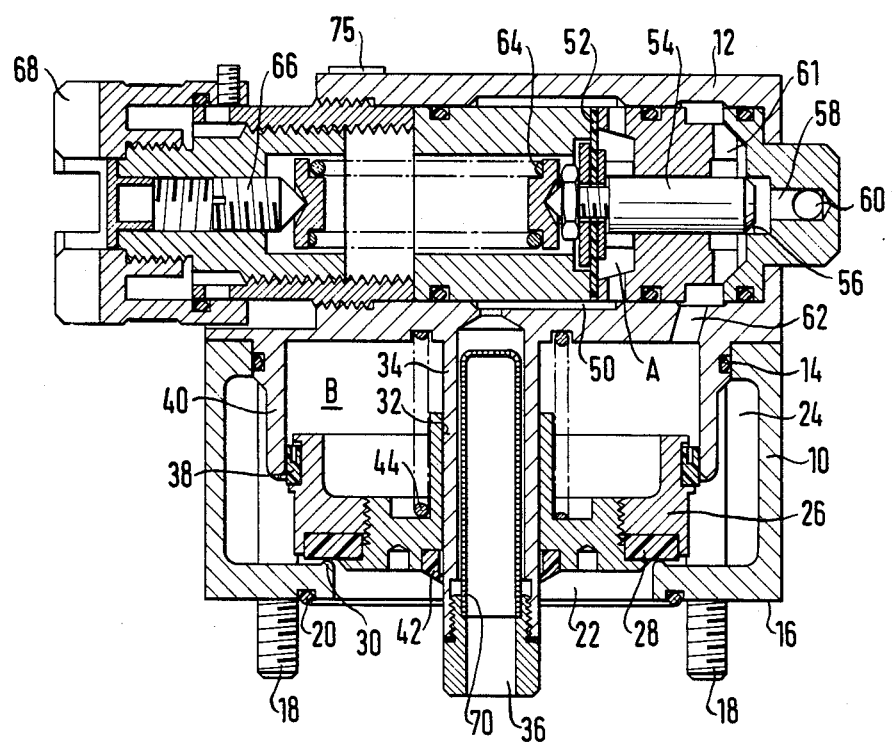
FIG. 2 is a section along the line II—II of FIG. 1.
Figure 3:
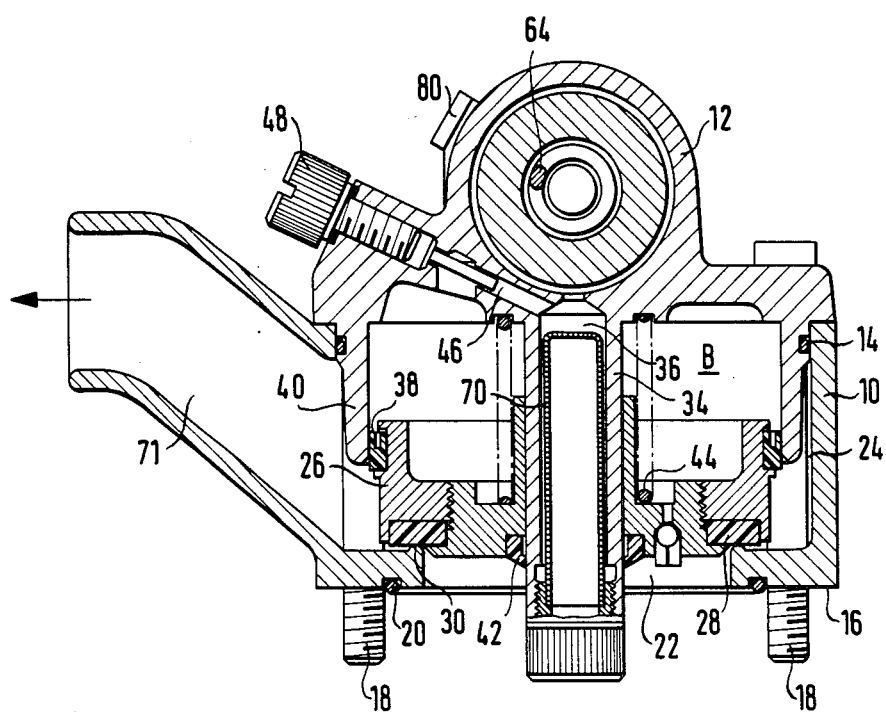
FIG. 3 is a section along the line III—III of FIG. 1.

A control space B is formed between the end face of the main piston 26 remote from the passage 22, the apron 40 of the control housing 12 and the lower side thereof facing the valve housing 10. This control chamber B communicates via a throttled connecting passage 46 shown in FIG. 3 with the end of the conduit 36 facing the control housing 12. The flow resistance of said connecting passage 46 can be adjusted by means of a throttle screw 48. From the same end of the conduit 36 a passage 50 extends which opens into an annular pilot space A which lies on the one side of a diaphragm 52 clamped at its outer periphery. In the centre the diaphragm 52 is connected to the valve piston 54 of the pilot valve on the free end face of which a conical metallic sealing face 56 is formed. Said sealing face 56 cooperates with a likewise metallic valve seat which is formed by the annular edge of a bore 58 coaxial with the valve piston 54. This bore 58 communicates on its one side with a bore 60 leading to the surrounding atmosphere and adjoins at its opposite end an annular passage 61 which surrounds the valve piston 54 and into which a bore 62 opens which connects said annular channel 61 to the control space B. As apparent from FIG. 2 the flow passage closable by the pilot valve comprises between the control space B and the bore 60 the annular passage 61 which surrounds the valve piston 54 and which lies adjacent the control space B and is directly connected to the latter via the short bore 62. The annular pilot space A lying coaxial with the annular passage 61 is connected via the short passage 60 to the conduit 36. The short and low-loss flow paths are of great significance as regards the high response speed of the pressure-limiting valve.

On its side facing the diaphragm 52 the valve piston 54 is acted upon by a pressure spring 64 whose spring tension is adjustable by means of a setting bolt 66. The setting bolt 66 is displaceable in the axial direction by a rotatable setting element 68 whose rotational movement is converted via a high pitch screw thread cooperating with a nut member to an axial movement of the setting bolt 66. The entire pressure adjustment range of the pressure-limiting valve can thus be covered with a rotation of the setting element 68 over only about 240°.

Inserted into said conduit 36 is a tubular screen or sieve 70 whose outer wall remains at a slight radial distance from the inner wall of the conduit 36 and whose end adjacent the connecting flange 16 is open whilst the opposite end is bordered by the sieve structure. Since the tubular sieve 70 has a large filtering area it can be made fine-mesh without causing high flow resistance. It thus prevents any penetration of contamination into the control space B and the pilot space A as well as the annular passage 60. Moreover, the pressure-limiting valve is constructed so that finer particles which can pass through the sieve 70 cannot settle anywhere. This applies in particular to the diaphragm 52 which in this respect is very advantageous compared with conventional embodiments with bellows-like separations between pilot space and accommodation space of the pressure spring receiving the valve piston of the pilot valve.

The mode of operation of the pilot-controlled pressure-limiting valve is readily apparent from the Figures. The water pressure obtaining in the flow passage of the water-conducting fitting is transmitted via the sieve 70 and the passage 50 into the annular pilot space A. If the water pressure rises above the set value the compressive force acting on the diaphragm 52 exceeds the force of the spring 64. As a result the sealing face 56 is lifted off the valve seat cooperating therewith so that water can flow out of the control space B to the bore 60 and into the surrounding atmosphere. Since the amount of water which can follow up from the flow passage into the control space B is limited by the throttle screw 48 the opening of the valve piston 54 results in a pressure drop in the control space B. With decreasing pressure in the control space B the main piston 26 is lifted by the water pressure from its valve seat 30 so that the excess amount of water delivered can flow into the surrounding atmosphere through the discharge 71 which leads from the annular passage 24. By suitable matching of the cross-sectional ratios and forces the main piston 26 will always be lifted from the valve seat 30 to such an extent that the pressure preselected by means of the setting element 68 arises. If the water pressure in the water-conducting fitting drops below the limiting pressure set the valve piston 54 is returned to its closure position by the force of the spring 64. Since however the water can still flow through the throttled connecting passage 46 into the control space B the main piston 26 is pressed against its valve seat 30 so that the annular passage 24 is shut off from the passage 22 connected to the flow passage.

At suitable points of the valve housing 10 and the control housing 12 bores are disposed into which check valves 80 are screwed. Said check valves 80 serve for automatic draining of the pressure-limiting valve in the pressureless state thereof.

As apparent from FIG. 1 the setting element 68 carries a scale 74 whose graduations (for example PSI units for US versions) can be brought into coincidence with a marking 75 on the control housing 12.

I claim:

1. A pilot-controlled pressure-limiting valve arranged adjacent a main flow passage formed in a water-conducting device, comprising: a disc-shaped main piston which on its side facing said main flow passage cooperates with an annular valve seat and on its side remote from said main flow passage defines a control chamber, said control chamber communicating via a throttled connection passage with said main flow passage, a pilot flow passage closable via a pilot valve having a pilot valve piston and a cooperating pilot valve seat connecting said control chamber to the surrounding atmosphere, further comprising a housing and a discharge which originates from an annular passage surrounding said main piston on its side remote from said main flow passage, said valve seat being disposed adjacent a connection flange on said housing, the pilot valve piston being disposed with its axis perpendicular to the axis of the main piston, said pilot flow passage comprising an annular passage which surrounds said pilot valve piston and which lies adjacent said control chamber and is connected to said control chamber via a bore, said annular passage having an end defined by said pilot valve seat and said pilot valve piston being connected to a diaphragm which is clamped at the housing and which defines a pilot space lying adjacent said control chamber and being separate from the annular passage, said pilot space being connected to said main flow passage via a conduit leading coaxially through the main piston.

2. The pressure-limiting valve according to claim 1, wherein an adjustable throttle screw is disposed in the throttled connected passage.

3. The pressure-limiting valve according to claim 1, wherein said pilot valve piston comprises a conical metallic sealing face which cooperates with the metallic pilot valve seat which is also metallic.

4. The pressure-limiting valve according to claim 1, wherein a fine-mesh tubular sieve is disposed in said conduit leading coaxially through said main piston with radial spacing from the surrounding wall of the conduit and comprising an open end facing the flow passage and an end facing said pilot space and defined by the structure of said sieve.

5. The pressure-limiting valve according to claim 1, wherein a pressure spring acts on said pilot valve piston in the closure direction and is arranged on the side of the diaphragm remote from the pilot valve piston and is biased by a setting bolt which is adjustable in the axial direction by means of a rotatable setting element whose rotation is converted by a high pitch screw thread cooperating with a nut member into a corresponding axial movement of the setting bolt.

6. The pressure-limiting valve according to claim 5, wherein the turning angle of said setting element is about 240°.

7. The pressure-limiting valve according to claim 1, wherein a plurality of bores are disposed in said housing, each bore having a check valve disposed therein.

* * * * *